United States Patent [19]

Uehara et al.

[11] Patent Number: 4,628,212
[45] Date of Patent: Dec. 9, 1986

[54] OCEANO-THERMOSTERIC POWER PLANT

[75] Inventors: Haruo Uehara; Tsutomu Nakaoka, both of Saga, Japan

[73] Assignee: Saga University, Saga, Japan

[21] Appl. No.: 722,368

[22] Filed: Apr. 12, 1985

[30] Foreign Application Priority Data

Apr. 17, 1984 [JP] Japan .................................. 59-75788

[51] Int. Cl.⁴ .......................... H02P 9/04; F03G 7/04
[52] U.S. Cl. ...................................... 290/54; 290/1 R; 290/52; 60/652; 60/676; 60/693; 60/641.7
[58] Field of Search ............................. 290/1 R, 52, 54; 60/641.1, 641.2, 641.3, 641.6, 641.7, 643, 676, 652

[56] References Cited

U.S. PATENT DOCUMENTS

| | | | |
|---|---|---|---|
| 2,461,449 | 2/1949 | Smith et al. | 60/641.7 X |
| 3,681,920 | 8/1972 | Margen | 60/652 |
| 4,014,279 | 3/1977 | Pearson | 60/641.7 X |
| 4,102,132 | 7/1978 | Anderson | 60/676 X |
| 4,104,535 | 8/1978 | Bronicki | 290/52 |
| 4,166,363 | 9/1979 | Mougin | 60/641.6 |
| 4,168,030 | 9/1979 | Timmerman | 60/693 X |
| 4,186,311 | 1/1980 | Humiston | 290/1 R |
| 4,189,647 | 2/1980 | Wittig | 290/52 X |
| 4,192,145 | 3/1980 | Tanaka | 60/641.1 X |
| 4,200,807 | 4/1980 | Humiston | 290/1 R |
| 4,302,682 | 11/1981 | La Coste | 290/1 R |
| 4,324,983 | 4/1982 | Humiston | 290/1 R |
| 4,347,702 | 9/1982 | Tawse | 60/676 X |
| 4,350,014 | 9/1982 | Sanchez et al. | 60/641.7 |
| 4,373,338 | 2/1983 | Van Der Pot | 60/641.7 |
| 4,417,446 | 11/1983 | Nakamoto et al. | 60/641.7 |
| 4,418,541 | 12/1983 | Russell | 60/676 X |

FOREIGN PATENT DOCUMENTS 0025348 2/1979 Japan .................................. 60/641.1

Primary Examiner—William M. Shoop, Jr.
Assistant Examiner—Shik Luen Paul Ip
Attorney, Agent, or Firm—Spencer & Frank

[57] ABSTRACT

An oceano-thermosteric power plant is provided with plural evaporators and plural condensers, alternate parts of which are not operated at night and in winter on light load and hence a high efficiency heat exchange can be maintained. During the period that selected condensers and evaporators are not in service, excess cold water from the out-of-service condensers is circulated through the out-of-service evaporators in the opposite direction and hence the filth deposited inside the out-of-service evaporators can be washed away.

3 Claims, 3 Drawing Figures

OCEANO-THERMOSTERIC POWER PLANT

BACKGROUND OF THE INVENTION

(1) Field of the Invention

The present invention relates to an oceano-thermosteric power plant in which electric power is generated by harnessing the temperature difference between warm water in the superficial layer of the ocean and cold water in the depth thereof, and, particularly, the operation efficiency on light load at night is improved and the filth deposited on components of the plant is washed away.

(2) Description of the Prior Art

The conventional oceano-thermosteric power plant of this kind is provided with an evaporator, a turbine connected with an electric generator and a condenser as the main components. In this connection, at the electric power generation effected by the turbine which is driven by an actuating liquid alternately evaporated and condensed on the basis of the temperature difference between the evaporator through which the warm water is circulated and the condenser through which the cold water is circulated, the warm water circulated through the evaporator after being drawn from the superficial layer of the ocean has a high temperature from 15 to 33 degrees centigrade, so that such a defect results that filth consisting of planktons, fish eggs and shellfish, dust and the like is deposited on heat-conducting surfaces of the main components and hence the efficiency of heat conduction is lowered. As for the prevention of filth deposition, customarily adopted for obviating this defect, chlorine is injected into the circulating water, or is generated in the circulating water by the electrolysis effected by electrodes provided therein for removing the biological filth, and sponge balls, brushes and the like are circulated together with the circulating water through the main components for removing the other filth. However, in the oceano-thermosteric power plant, the temperature difference available for the heat exchange is so small that a large amount of circulating water is required. Accordingly, the above customarily adopted means for preventing the deposition of filth causes serious troubles such as great expense, environment pollution and others. Concretely speaking, a number of sponge balls, brushes and the like are not only necessitated, but also result in lowered net power output caused by the increase of motive power consumed in the drawing pump, which is generally based on the increased circulation resistance originated therefrom, so that the increase of the cost of equipment and the unit price of power generation results therefrom.

Consequently, the conventional oceano-thermosteric power plant has a shortcoming such that the customary protection of filth can be hardly employed therefor and further results in increased cost.

SUMMARY OF THE INVENTION

An object of the present invention is to provide an oceano-thermosteric power plant in which the above shortcoming is obviated such that, during the night on light load, the operating efficiency is improved, as well as the filth deposited on the main components efficiently washed away.

For attaining the above object, in the oceano-thermosteric power plant, the main components thereof consist of the combination of plural evaporators and plural condensers, which are arranged in parallel respectively, with the turbine and the electric generator. During daytime on heavy load, all of those evaporators and condensers are operated in parallel respectively, so as to deal with the large power demand; during the night on light load, the number of operated evaporators and operated condensers is reduced, so as to efficiently deal with the reduced power demand.

In addition thereto, the power plant of the present invention is arranged in that the filth deposited on the main components during the daytime can be washed away with back-flowing clean cold water by circulating the excess cold water saved in the unoperated condensers through the unoperated evaporators in the direction opposite to the ordinary circulation of the warm water under the periodic alternation of the unoperated evaporators, so as to maintain the high efficiency of heat conduction effected by all of the evaporators under the continuation of the electric power generation. In this connection, the cavitation caused by the re-evaporation of the actuating liquid can be prevented by enclosing the circulating path thereof from each of the outlets of the evaporators to the supplying pump therefor with water jackets.

In other words, the present invention is featured in that, in the oceano-thermosteric power plant arranged such that the electric power generation is effected by the vapor of the actuating liquid, which vapor is formed by the evaporation thereof effected by the warm water supplied to the evaporating section after drawn from the superficial layer of the ocean and introduced into the electric power generating section, the actuating liquid, which is formed by condensing the vapor thereof exhausted from the electric power generating section with the cold water circulated through the condensing section after being drawn from the depth of the ocean, being circulated through the evaporating section via a liquid reservoir and a supplying pump, the evaporating section and the condensing section are provided with plural evaporators and plural condensers respectively, a part of the plural evaporators being alternately situated during the night without the introduced warm water, so as to be unoperated, meanwhile the cold water being circulated alternately through the part of the plural evaporators in the direction opposite to the warm water circulated at the operation thereof, so as to wash away the filth deposited on the plural evaporators.

BRIEF DESCRIPTION OF THE DRAWINGS

For the better understanding of the invention, reference is made to the accompanying drawings, in which.

Throughout different views of the drawings, A is an oceano-thermosteric power plant: 1 is an evaporating section; 1-1 and 1-2 are evaporators; 2 is an electric power generating section; 3 is a condensing section; 3-1 and 3-2 are condensers; 4 is a liquid supplying section; 9 is a liquid reservoir; 10 is a liquid supplying pump; 11 is an actuating liquid inlet; 12 is a water jacket; 13-1 to 13-8 are stopping valves; 14 is a warm water pipe; 15-1 and 15-2 are inlet valves; 16-1 and 16-2 are outlet valves; 17 is a warm water exhausting pipe; 18 is a cold water pipe; 19-1 and 19-2 are cold water valves; 20 is a warm water exhausting pipe; 21 is a throttle valve; 22 is an elongated portion; 23-1 and 23-2 are warm water inlets; 24-1 and 24-2 are washing water inlet valves; 25-1 and 25-2 are warm water inlets; 26-1 and 26-2 are washing water outlet valves; and 27 is a washing water exhausting pipe.

DESCRIPTION OF THE PREFERRED EMBODIMENTS

Figure 1:
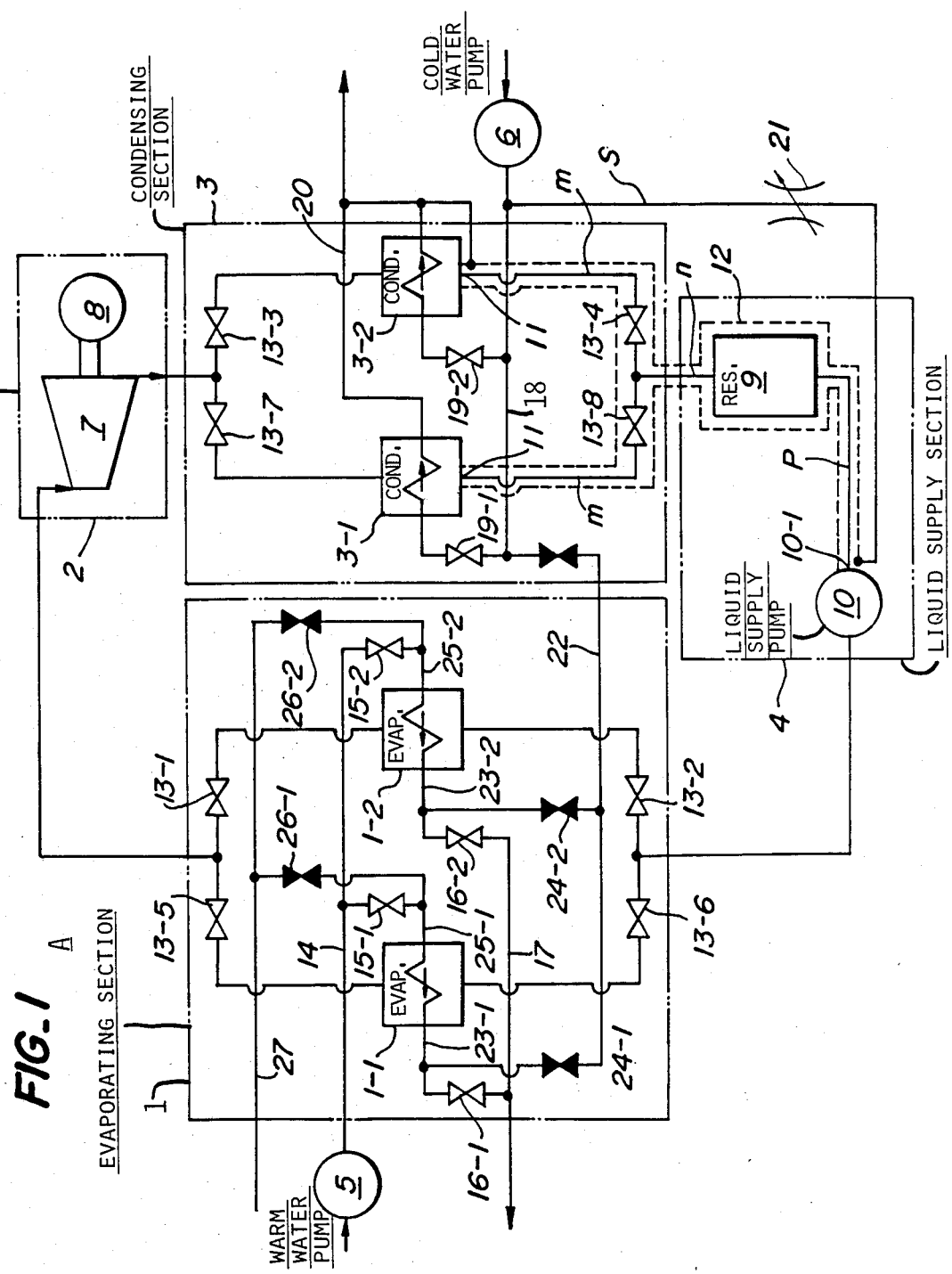
FIG. 1 is a circuit diagram showing an example of the arrangement of the oceano-thermosteric power plant according to the present invention.

The oceano-thermosteric power plant arranged as shown in FIG. 1 according to the present invention consists of an evaporating section 1, an electric power generating section 2, a condensing section 3, a liquid supplying section 4, a warm water pump 5 and a cold water pump 6, these sections and instruments being connected with each other through pipes and valves.

In the above exemplified arrangement, the evaporating section 1 is arranged such that two evaporators 1-1 and 1-2 are connected to each other in parallel with respect to the actuating liquid, and to a warm water pump 5 in common, so as to evaporate the actuating liquid by heating it with the warm water supplied from the warm water pump 5.

On the other hand, the electric power generating section 2 consists of a turbine 7 driven by the vapor of the actuating liquid and an electric generator 8 connected therewith.

Besides, the condensing section 3 is arranged such that two condensers, a first 3-1 and a second 3-2, are connected with each other in parallel, so as to condense the vapor of the actuating liquid which vapor is exhausted from the turbine 7 by means of circulating the cold water drawn from the depth of the ocean by a cold water pump 6 therethrough.

On the other hand, the liquid supplying section 4 consists of a liquid reservoir 9 and a liquid supplying pump 10, so as to pressure-transport the actuating liquid separated from the vapor thereof through the liquid reservoir 9 into the evaporating section 1 through the liquid supplying pump 10. In this connection, a suction head required for obviating the vapor locking caused by cavitation is provided between the liquid reservoir 9 and the liquid supplying pump 10. In addition, the liquid path from an actuating liquid outlet 11 of the condensing section 3 to an inhaling inlet 10-1 is enclosed with a water jacket 12 over all of the surrounding surface thereof including the liquid reservoir 9, so as to further cool the previously condensed actuating liquid for obviating the occurrence of the perturbation caused by the back pressure of the turbine 7 by means of preventing the generation of bubbles in the actuating liquid. In this connection, it can be attained together therewith to lower the installed height of the power plant A by means of lowering the suction head of the liquid supplying pump 10 through this cooling of the actuating liquid.

In the power plant A arranged as described above, the actuating liquid is vaporized by the pressure transportation from the liquid reservoir 9 to the first and the second evaporators 1-1 and 1-2 provided in the evaporating section 1 through the liquid supplying pump 10, the vapor of the actuating liquid being supplied into the turbine 7, so as to effect the electric power generation through the electric generator 8 driven by the turbine 7. Thereafter, the vapor of the actuating liquid which vapor is exhausted from the turbine 7 is condensed by the passage through the first and the second condensers 3-1 and 3-2 in the condensing section 3, so as to return into the actuating liquid to be brought back into the liquid reservoir 9 through the above mentioned cycle. As a result of this cycle, the heat energy obtained on the basis of the temperature difference between the warm water in the evaporating section 1 and the cold water in the condensing section 3 is converted into an amount of electric energy corresponding to the energy state variation of the actuating liquid, so as to derive the required electric power therefrom. In this connection, the numerals 13-1 to 13-8 denote stopping valves attached with back sheets which valves are provided for stopping the circulation of the actuating liquid through the unoperated evaporators and the unoperated condensers.

On the other hand, the warm water drawn from the superficial layer of the ocean through the warm water pump 5 is branched through warm water pipes 14 and supplied to the first and the second evaporators 1-1 and 1-2 through first and second inlet valves 15-1 and 15-2 respectively, so as to heat the actuating liquid therein. Thereafter, the warm water is exhausted through a warm water exhausting pipe 17 after passing through first and second outlet valves 16-1 and 16-2 respectively.

In contrast thereto, the cold water drawn from the depth of the ocean through the cold water pump 6 is branched through cold water pipes 18 and supplied to the first and second condensers 3-1 and 3-2 through first and second cold water valves 19-1 and 19-2 respectively, so as to cool the actuating liquid. Thereafter, the cold water from each of the condensor is joined and exhausted through a cold water exhausting pipe 20.

In this connection, the circulating path m from each of actuating liquid outlets 11 of the condensers 3-1, 3-2 to the stopping valves 13-4, 13-8, the circulating path n from those stopping valves 13-4, 13-8 to the liquid reservoir 9 and the circulating path p from the liquid reservoir 9 to the liquid supplying pump 10 including the stopping valves 13-4, 13-8 and the liquid reservoir 9 are enclosed by water jackets 12 surrounding outer surfaces thereof, those water jackets 12 being supplied with the cold water introduced through a cold water bypass s connected with the cold water pipe 18, so as to cool those components in the circulating paths m, n, p, the liquid reservoir 9 and the stopping valves 13-4, 13-8 from the outer surfaces thereof.

In the drawings, 21 denotes a throttle valve provided midway in the cold water bypass s, so as to regulate the amount of cold water flowing through the water jackets 12.

On the other hand, an elongated portion 22 is branched from the cold water pipe 18 toward the evaporating section 1, and the tip of this elongated portion 22 being further branched and connected at midpoints between respective warm water outlets 23-1 and 23-2 of the first and the second evaporators and the first and the second outlet valves 16-1 and 16-2 respectively through first and second washing water inlet valves 24-1 and 24-2. In addition, the washing water supplied as mentioned above is exhausted through a washing water exhausting pipe 27 after passing through first and second washing water outlet valves 26-1 and 26-2 which are branched and connected respectively to the junctions of first and second warm water inlets 25-1 and 25-2 of the first and the second evaporator 1-1 and 1-2 and the inlet valves 15-1 and 15-2, respectively.

In the oceano-thermosteric power plant according to the present invention which is arranged as described above, during the daytime when electric power demand is increased, the operational situation as shown in FIG. 1, where the first and the second washing water inlet valves 24-1, 24-2 and the respective inlet valves 26-1, 26-2 are closed as indicated by fully blackened symbols thereof in FIG. 1, while all of the remaining valves are opened, is employed.

As a result thereof, both the warm and cold water and the actuating liquid are circulated in parallel through the first and the second evaporators 1-1, 1-2 in the evaporating section 1 and the first and second condensers 3-1, 3-2 therein, so as to deal with the electric power demand increased during the daytime by means of carrying out the full power operation maximizing both the amounts of evaporated and condensed actuating liquids.

Figure 2:
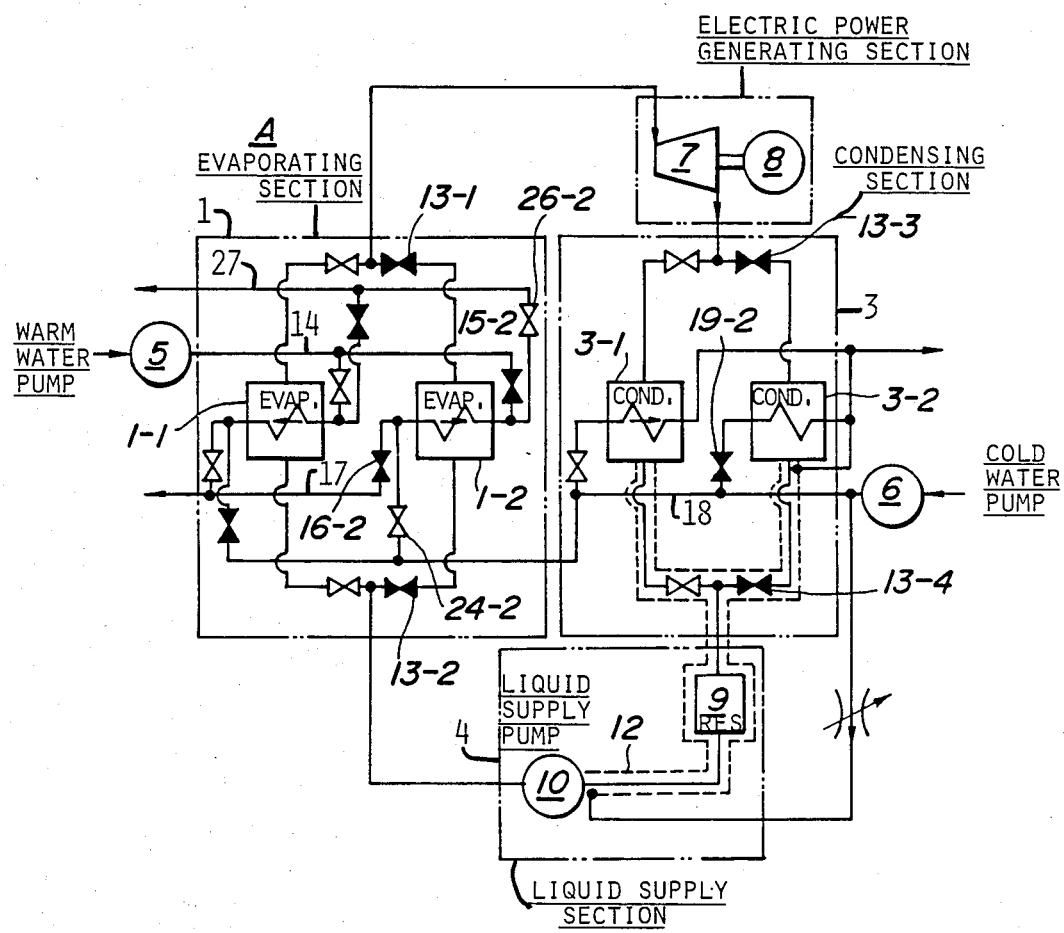
FIGS. 2 and 3 are circuit diagrams showing examples of the situation of lowered power operation of the same respectively.

On the other hand, during the night when electric power demand is substantially halved and hence both the amounts of evaporated and condensed actuating liquid can be substantially halved, the operational situation as shown in FIG. 2, where, for instance, the first evaporator 1-1 and the first condenser 3-1 are operated, meanwhile the second evaporator 1-2 and the second condenser 3-2 are not operated, in other words, the operational situation where the second evaporator 1-2 and the second condenser 3-2 are excluded from the above mentioned situation of full power operation by means of closing the actuating liquid stopping valves 13-1, 13-2, 13-3, 13-4 connected therewith as well as by means of closing the second inlet valve 15-2 of the second evaporator 1-2 and the second outlet valve 16-2 together with the second cold water valve 19-2 of the second condenser 3-2 is employed.

As a result thereof, half power operation is achieved in which both the amounts of evaporated and condensed actuating liquids are halved by not operating the second evaporator 1-2 and the second condenser 3-2, so as to deal with the halved electric power demand during the night.

In connection with this half power operational situation, by means of opening the second washing water inlet valve 24-2 and the outlet valve 26-2, the excess cold water drawn by the cold water pump 6 is circulated through the second washing water inlet valve 24-2 from the second warm outlet 23-2 toward the second warm water inlet 25-2, in other words, in the direction opposite to the ordinarily circulated warm water, so as to wash away the filth deposited inside the second evaporator 1-3 during the daytime with the back flow of cold water through the second washing water outlet valve 26-2 as well as to exhaust it outside the power plant A through a washing water exhausting pipe 27.

In addition, the efficiency of heat exchange of the whole power plant A can be further improved by the sequential alternation at every predetermined period of the pair of evaporator and condenser to be taken out of service and washed.

The operation and the effect of the above prevention and removal of filth deposition has been confirmed through the present inventor's experiments carried out over many years.

In addition, the cavitation caused by the reevaporation of the actuating liquid can be prevented by means of enclosing the actuating liquid path from the first and the second condensers 3-1 and 3-2 to the liquid supplying pump 10 with the water jackets 12 through which the cold water is circulated, and hence the occurrence of perturbation caused by the back pressure of the turbine can be prevented also. As a result, the quiet and smooth revolution thereof can be attained, and the suction head required for the liquid supplying pump 10 can be lowered, so as to lower the installed height of the power plant A.

Figure 3:
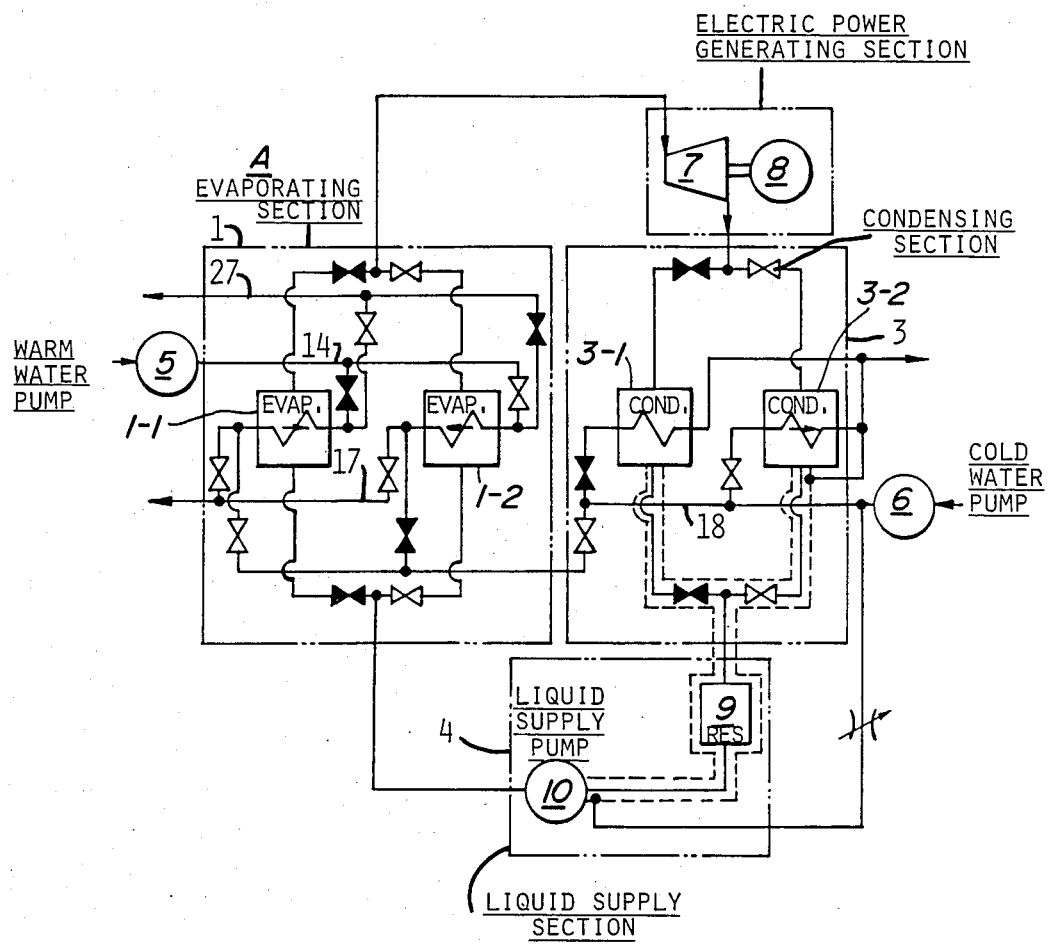

Next, contrary to the operational situation shown in FIG. 2, the other operational situation where the second evaporator 1-2 and the second condenser 3-2 are operated, meanwhile the first evaporator 1-1 and the first condenser 3-1 are not operated is shown in FIG. 3. In this connection, the combination of operated and not operated components can be further changed, for instance, such as the first evaporator 1-1 and the second condenser 3-2, or, the second evaporator 1-2 and the first condenser 3-1.

The selection of these combinations can be readily attained as occasion demands by means of opening and closing valves individually belonging each of those components.

In addition, in response to the seasonal variation of the electric power demand, the highest peak in the summer of the electric power demand can be dealt with by constituting the evaporating and the condensing sections of plural evaporators and condensers respectively, meanwhile the seasonally lowered peak in the winter of the electric power demand can be dealt with by taking out of service a part of those plural evaporators and condensers for a long time, during which the decomposition maintenance of those out-of-service components and the removal of the filth deposited thereon are carried out.

As is apparent from the above description, in the oceano-thermosteric power plant according to the present invention, the evaporating and condensing sections are provided with plural evaporators and plural condensers respectively, respective parts of which are alternately taking out of service when the electric power demand is reduced. The excess cold water drawn from the depth of the ocean and saved by the out-of-service condensers is circulated through out-of-service evaporators in the direction opposite to the warm water drawn from the superficial layer of the ocean and supplied to those evaporators during ordinary operation. As a result, the filth deposited inside the operated evaporators can be washed away, as well as the efficiency of heat exchange effected by those operated evaporators can be maintained at a high level by the alternate removal of those condensers and evaporators from service. In addition, the circulating path of the actuating liquid in the power plant according to the present invention is enclosed by the water jacket from the outlets of the condensers to the liquid supplying pump, so as to obviate the cavitation of the actuating liquid. Consequently, the evident effects as mentioned above can be obtained according to the present invention.

What is claimed is:

1. An oceano-thermosteric power plant, comprising generating means for generating electrical energy from the vapor of an actuating liquid, said generating means having an input and an output;
evaporating means including a plurality of evaporators each having a first part for the circulation therethrough of warm ocean water drawn from a superficial layer of the ocean and a second part for receiving said actuating liquid, the outputs of the second parts of said evaporators being connected to the input of said generating means,
condensing means including a plurality of condensers each having a first part for the circulation of cold ocean water therethrough, said cold water being obtained from a location in the ocean relatively far below the surface thereof, and a second part for receiving vapor from the output of said generating means, the inputs of the second parts of said condensers being connected to the output of said generating means;

actuating liquid supply means comprising a liquid reservoir and a liquid supply pump connected thereto, the input of said actuating liquid supply means being connected to the outputs of the second parts of said condensers, and the output of said actuating liquid supply means being connected to the inputs of the second parts of said evaporators, said actuating liquid being formed in said condensing means by condensing vapor exhausted from the output of said generating means;

means for supplying said warm water to the first parts of said evaporators, said warm water flowing through said evaporators in a given direction to transform the liquid from the output of said actuating liquid supply means to a vapor for introduction into said generating means; and means for disconnecting the supply of warm water from the first part of at least one selected evaporator and for circulating said cold water through said selected evaporator in a direction opposite said given direction, whereby during periods of relatively light electrical load cold water is circulated through said selected evaporator to remove filth deposited therein.

2. The oceano-thermosteric power plant defined by claim 1 wherein each of said evaporators is selected in turn for circulation of said cold water therethrough, said cold water effectively removing filth from the selected evaporator.

3. The oceano-thermosteric power plant defined by claim 1 which further comprises a water jacket surrounding the connections through which said actuating liquid flows from the outputs of the second parts of said condensers, said reservoir and the connection between said liquid reservoir and said liquid supply pump.

* * * * *